(12) United States Patent
Suzuka (10) Patent No.: US 6,218,044 B1
(45) Date of Patent: Apr. 17, 2001

(54) OPENING AND CLOSING MECHANISM FOR BATTERY COMPARTMENT AND WATERPROOF/DRIP PROOF COVER FOR THE SAME

(75) Inventor: Shinya Suzuka, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/235,377

(22) Filed: Jan. 22, 1999

(30) Foreign Application Priority Data

Jan. 26, 1998 (JP) .................................................. 10-12768
Jan. 26, 1998 (JP) .................................................. 10-12769

(51) Int. Cl.[7] .................................................. H01M 2/04
(52) U.S. Cl. ........................................... 429/175; 429/121
(58) Field of Search .............................. 429/97, 100, 121, 429/96, 98, 151, 163, 175, 182, 183, 185

(56) References Cited

U.S. PATENT DOCUMENTS 5,634,815 * 6/1997 Inazuka et al. ..................... 439/500

5,782,654  7/1998 Inazuka et al. .

* cited by examiner

*Primary Examiner*—Stephen Kalafut
*Assistant Examiner*—M. Wills
(74) *Attorney, Agent, or Firm*—Greenblum & Bernstein, P.L.C.

(57) ABSTRACT

An opening and closing mechanism for a battery compartment including: a circular opening formed in a battery compartment; a plurality of disengagement prevention flanges that are formed at the peripheral edge of the circular opening; a circular cover for the circular opening; and a plurality of lock pawls provided at the peripheral edge of the circular cover. The lock pawls can enter the spaces between the flanges in an unlocking position of the circular cover and are located on the back surfaces of the flanges when the circular cover rotates from the unlocking position to a lock position. The lengths of the disengagement prevention flanges and the lock pawls in the circumferential direction are set so that when the circular cover is rotated by a predetermined angle from the unlocking position in a direction opposite to the direction toward the lock position, the lock pawls are still held in the spaces between the disengagement prevention flanges.

20 Claims, 10 Drawing Sheets

OPENING AND CLOSING MECHANISM FOR BATTERY COMPARTMENT AND WATER-PROOF/DRIP PROOF COVER FOR THE SAME

BACKGROUND OF THE INVENTION

1. Field of the Invention

The present invention relates to an opening and closing mechanism for a battery compartment, and a cover of a water-proof structure for a battery compartment.

2. Description of the Related Art

In a known cover which opens and closes an opening of a battery compartment, the cover is rotated between an unlocking position in which the cover is detachably attached and a lock position wherein the cover cannot be removed. A battery received in the battery compartment is biased in a discharge direction by a resilient piece constituting an electrical conductor, so that the cover can be easily moved upward in the unlocking position. However, if a cover having a seal member such as an O-ring is used to close a battery compartment of a water proof/drip-proof device, it is difficult to detach the cover even the cover is positioned at the unlocking position. The seal member is elastically deformed to seal the battery compartment in a water-tight fashion when the cover is in a lock position. If the cover is in a locked state for long time, the seal member tends not to be restored rapidly from a deformed state. Consequently, the cover does not tend to move upward (open) in the unlocking position, and hence, it is necessary to forcedly insert a tool having a sharp end between the cover and the opening of the battery compartment in order to open the cover. When no battery is loaded in the battery compartment, since there is no biasing force acting on the battery, the cover tends not to open. If a mechanism which makes it possible to always forcedly detach the cover in the unlocking position is provided, the cover has a tendency to be accidentally detached, and thus, the cover can be easily lost or damaged. Under these circumstances, it has been necessary to provide an opening and closing mechanism for a battery compartment in which a forced open position in which the cover can be forcedly opened and a normal unlocking position can be selected.

Moreover, there is a problem with the cover itself. Namely, the cover for a battery compartment of a water-proof and drip-proof structure must be provided with a receiving portion in which an elastic seal member such as an O-ring is held, so that the seal member is exposed to the peripheral surface of the cover. The receiving portion for the elastic seal member can be obtained by forming an annular groove on the peripheral surface upon forming the cover body. Alternatively, the receiving portion can be obtained by forming a projection in the form of a rib on the peripheral surface of the cover body, so that another member which defines opposed wall surfaces is secured to the projection by means of screws, etc.

To form an annular groove on the peripheral surface of the cover body, expensive sliding dies must be used. In addition, a parting line of the dies extends across the annular groove, i.e., the elastic seal member receiving portion. Since a stepped portion or a burr tends to occur at the parting line, a gap between the elastic seal member and the annular groove tends to occur, thus resulting in a failure to seal properly. On the other hand, in the above mentioned alternative, the screws must be used to attach the separate member which defines the opposed wall surfaces to the cover body, thus resulting in an increased number of assembling processes and an increased manufacturing cost. Therefore, there is a need to provide a cover of waterproof/drip-proof structure for a battery compartment cover which is free from the above mentioned drawbacks.

SUMMARY OF THE INVENTION

It is an object of the present invention to provide a simple opening and closing mechanism for a battery compartment in which the operation efficiency can be enhanced.

Another object of the present invention to provide a cover of a water-proof/drip-proof structure for a battery compartment which can be easily assembled at a lower manufacturing cost without reducing the water-proof efficiency thereof.

According to the present invention, there is provided an opening and closing mechanism for a battery compartment including: a circular opening formed in a battery compartment; a plurality of disengagement prevention flanges that are formed at the peripheral edge of the circular opening; a circular cover for the circular opening; and a plurality of lock pawls provided at the peripheral edge of the circular cover. The lock pawls can enter the spaces between the flanges in an unlocking position of the circular cover and are located on the back surfaces of the flanges when the circular cover rotates from the unlocking position to a lock position. The lengths of the disengagement prevention flanges and the lock pawls in the circumferential direction are set so that when the circular cover is rotated by a predetermined angle from the unlocking position in a direction opposite to the direction toward the lock position, the lock pawls are still held in the spaces between the disengagement prevention flanges.

Preferably a forced opening mechanism is further provided between the circular opening and the circular cover, which forces the circular cover to move in a direction away from the circular opening in accordance with the rotation of the circular cover through a predetermined angle from the unlocking position toward the opposite direction.

Preferably, the forced opening guide mechanism includes: a cam projection provided at the periphery of the circular cover, the cam projection extending in a plane perpendicular to the axis thereof; a guide recess that is formed at the periphery of the circular opening to guide the cam projection so as to allow rotation of the circular cover; and an oblique cam surface that is formed at the periphery of the circular opening and that is connected to the guide recess, the depth of the oblique cam surface being gradually decreased from the guide recess, so that the cam projection can be guided to move away from the circular opening.

Preferably, the guide recess has a uniform depth.

Preferably, the circular cover is provided with a seal member, the seal member being depressed between the circular cover and the periphery of the circular opening to be elastically deformed in the lock position to seal the circular opening of the battery compartment in a water-tight fashion.

According to another aspect of the present invention there is also provided a circular cover for closing a cylindrical battery compartment which has a circular opening at one end thereof, in a water-tight fashion including: a cover body which is composed of a circular disc portion corresponding to the circular opening and a cylindrical portion which extends in a direction perpendicular to the circular disc portion and which supports an annular elastic seal member on the outer peripheral surface thereof to seal the circular opening in a water-tight fashion; a battery contact plate including a conductor and secured to the cover body at a predetermined distance from the end of the cylindrical portion of the cover body; a support plate which is provided between the end of the cylindrical portion of the cover body and the battery contact plate to hold the annular elastic seal member between the support plate and the circular disc portion; and a plurality of projecting supports which are provided on either the support plate or the battery contact plate so as to bias the support plate to abut against the end of the cylindrical portion.

Preferably, the support plate is not secured to the cover body while the battery contact plate is secured to the cover body, whereby the support plate is biased to abut against the end of the cylindrical portion of the cover body through the projecting supports.

Preferably, the projecting supports have enough resilience to bias the support plate in a direction to abut against the end of the cylindrical portion of the cover body.

Preferably, the length of the projecting supports (in a direction parallel to the axis of the circular cover) is greater than the distance between the battery contact plate secured to the cover body and the end of the cylindrical portion of the cover body, so that when the battery contact plate is secured, the projecting supports are held between the battery contact plate and the support plate and a plastic deformation of the projecting supports occurs to hold the support plate so as to abut against the end of the cylindrical portion of the cover body.

Preferably, a plurality of disengagement prevention flanges that are formed at the peripheral edge of the circular opening, and a plurality of lock pawls provided at the peripheral edge of the cover body are further provided. These lock pawls can enter the spaces between the flanges in an unlocking position of the cover body and are located on the back surfaces of the flanges when the cover body rotates from the unlocking position to a lock position. The lengths of the disengagement prevention flanges and the lock pawls in the circumferential direction are set so that when the cover body is rotated by a predetermined angle from the unlocking position in a direction opposite to the direction toward the lock position, the lock pawls are still held in the spaces between the disengagement prevention flanges.

Preferably, a forced opening guide mechanism is further provided between the circular opening and the cover, which forces the cover to move in a direction away from the circular opening in accordance with the rotation of the cover through a predetermined angle from the unlocking position toward the opposite direction.

Preferably, the forced opening guide mechanism includes: a cam projection provided at the periphery of the cover body, the cam projection extending in a plane perpendicular to the axis of thereof; a guide recess that is formed at the periphery of the circular opening to guide the cam projection so as to allow rotation of the cover; and an oblique cam surface that is formed at the periphery of the circular opening and that is connected to the guide recess, the depth of the oblique cam surface being gradually decreased from the guide recess, so that the cam projection can be guided to move away from the circular opening.

Preferably, the guide recess has a uniform depth.

Preferably, the cover body is provided with a seal member, the seal member being depressed between the cover and the periphery of the circular opening to be elastically deformed in the lock position to seal the circular opening of the battery compartment in a water-tight fashion.

According to another aspect of the present invention there is also provided an opening and closing mechanism for a battery compartment including: a circular opening formed in a battery compartment; and an opening and closing circular cover for the circular opening, the cover being rotatable relative to the circular opening between a lock position and an unlocking position, the cover closing the opening when the cover is positioned at the lock position and being detachable to the circular opening when the cover is positioned at the unlocking position. The cover is further rotatable relative to the circular opening when the cover is positioned at the unlocking position by a predetermined angle in a direction opposite to the direction toward the lock position. The cover is detachable to the circular opening at any rotational position between the unlocking position and the rotational extremity in the direction opposite to the lock position.

Preferably, a forced opening guide mechanism is further provided between the circular opening and the cover, which forces the cover to move in a direction away from the circular opening in accordance with the rotation of the cover through a predetermined angle from the unlocking position toward the opposite direction.

The present disclosure relates to subject matter contained in Japanese Patent Applications Nos. 10-12768 and 10-12769, both filed on Jan. 26, 1998, which are expressly incorporated herein by reference in their entireties.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
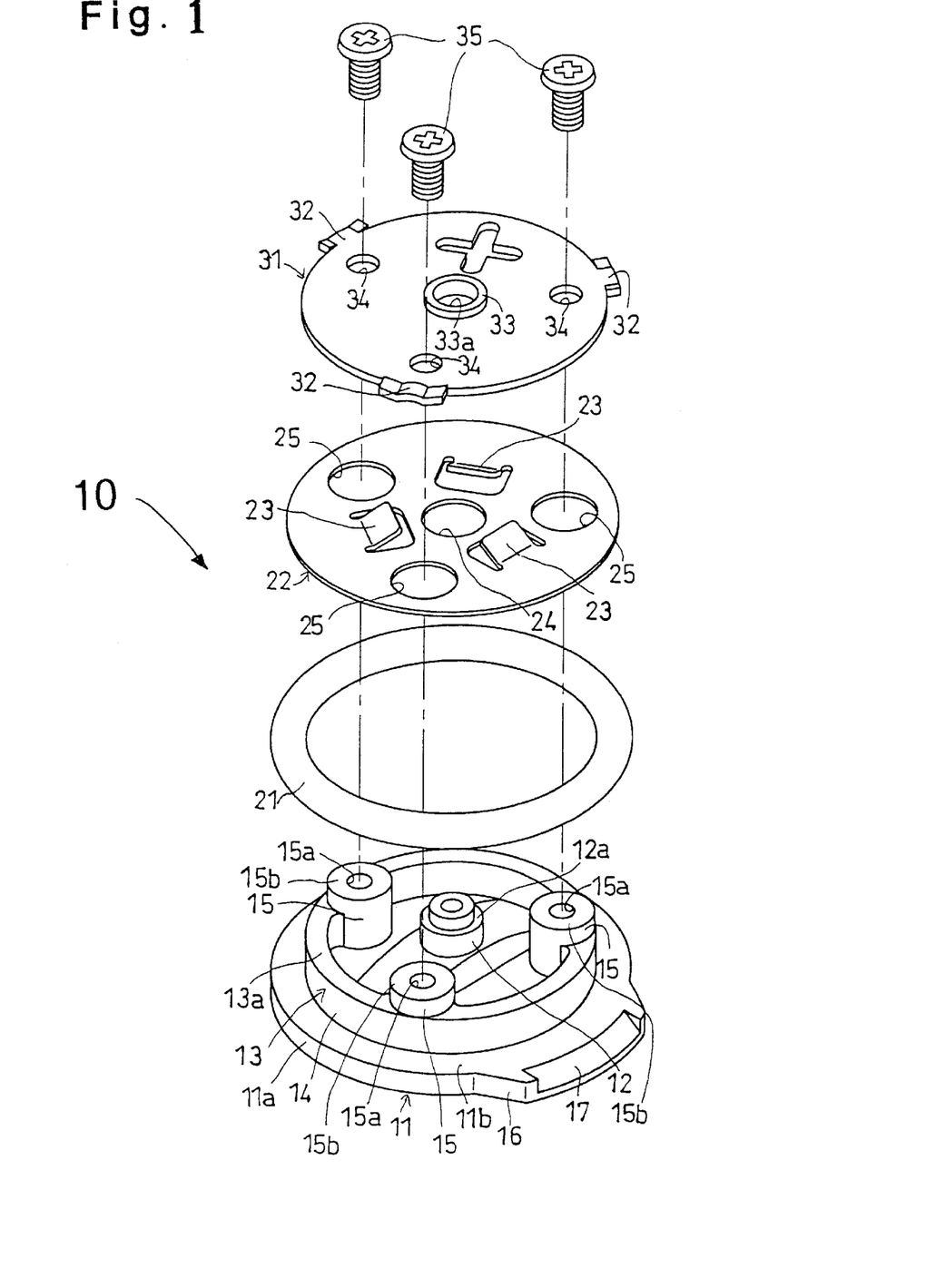
FIG. 1 is an exploded perspective view of a cover for a battery compartment, viewed from the rear side (battery contact plate side)

As shown in FIG. 1, a (circular) cover 10 for a battery compartment comprises a cover body 11 having a circular disc portion 11a. An O-ring 21, an O-ring support plate 22 and a battery contact plate 31 are provided on a rear surface 11b of the disc portion 11a.

The disc portion 11a of the cover body 11 is provided on the substantially center portion of the rear surface 11b with a positioning projection 12. The positioning projection 12 is composed of two coaxial cylindrical portions having different diameters. The larger diameter cylindrical portion defines at its end surface a restriction surface 12a. The disc portion 11a is provided on the rear surface 11b thereof with a cylindrical O-ring mounting rib (projection) 13 whose axis is identical to the axis of the center projection 12. The O-ring mounting rib 13 is provided with an outer peripheral surface which defines an O-ring support surface 14. The O-ring support surface 14 is a smoothly-finished cylindrical surface. Three cylindrical spacers 15 are provided on the rear surface 11b. The spacers 15 are spaced from one another at a substantially equi-angular distance on a circle whose center is located on the axis of the center projection 12. The height (length of projection) of the spacers 15 in the axial direction (perpendicular to the plane of the cover body 11) is greater than that of the O-ring mounting rib 13. The cylindrical spacers 15 are each provided with an axially extending threaded hole 15a. The restriction surface 12a and the end surfaces of the three cylindrical spacers 15 are substantially flush with each other. The cylindrical spacers 15 are located radially inside the O-ring mounting rib 13. The rear surface 11b of the disc portion 11a of the cover body 11 is also a uniformly, smoothly-finished surface, except for the projections provided thereon, such as the positioning projection 12, the O-ring mounting rib 13, and the cylindrical spacers 15, etc.

The cover body 11 is provided with a cam projection 16 which extends in the radial and outward direction. The cam projection 16 is equipped on its rear surface with an oblique surface 17. The oblique surface 17 is inclined so that the thickness of the cam projection 16 thereat gradually decreases toward the outer edge thereof. The cover body 11 is provided on the front surface thereof with a rotational operation groove 18 (FIGS. 4 through 6) in which a circumferential edge of a disc member (e.g., coin) can be fitted.

The O-ring 21 is made of a water-impermeable annular resilient body whose inner diameter is slightly smaller than the outer diameter of the O-ring mounting rib 13 (O-ring support surface 14) of the cover body 11. The thickness of the O-ring 21 is such that it can be elastically deformed, as will be discussed hereinafter.

The O-ring support plate 22 is cut and bent at three portions thereof toward the battery contact plate 31 to define elastically deformable support portions (spring portions) 23. The O-ring support plate 22 is equipped at the substantially central portion thereof with a positioning hole 24 corresponding to the large diameter portion of the positioning projection 12 of the cover body 11. The positioning hole 24 is surrounded by three insertion holes 25 formed in the O-ring support plate 22 and corresponding to the three cylindrical spacers 15 of the cover body 11, so that the cylindrical spacers 15 can be inserted in the corresponding insertion holes 25.

The entirety of the battery contact plate 31 is made of an electrically conductive material and is provided on its peripheral edge with three lock pawls (radial projections) 32 which are circumferentially spaced at a substantially equi-angular distance. The battery contact plate 31 is provided with a positioning hole 33a formed around the center portion thereof, corresponding to the small diameter portion of the positioning projection 12. An annular contact portion 33 extending in the direction away from the cover body 11 surrounds the positioning hole 33a. The battery contact plate 31 is equipped with three through holes 34 corresponding to the threaded holes 15a of the cover body 11. The outer diameter of the circular disc portion of the battery contact plate 31 (excluding the lock pawls 32) is smaller than the diameter of the O-ring support plate 22 and the outer diameter of the three lock pawls 32 is substantially identical to the O-ring support plate 22.

Figure 2:
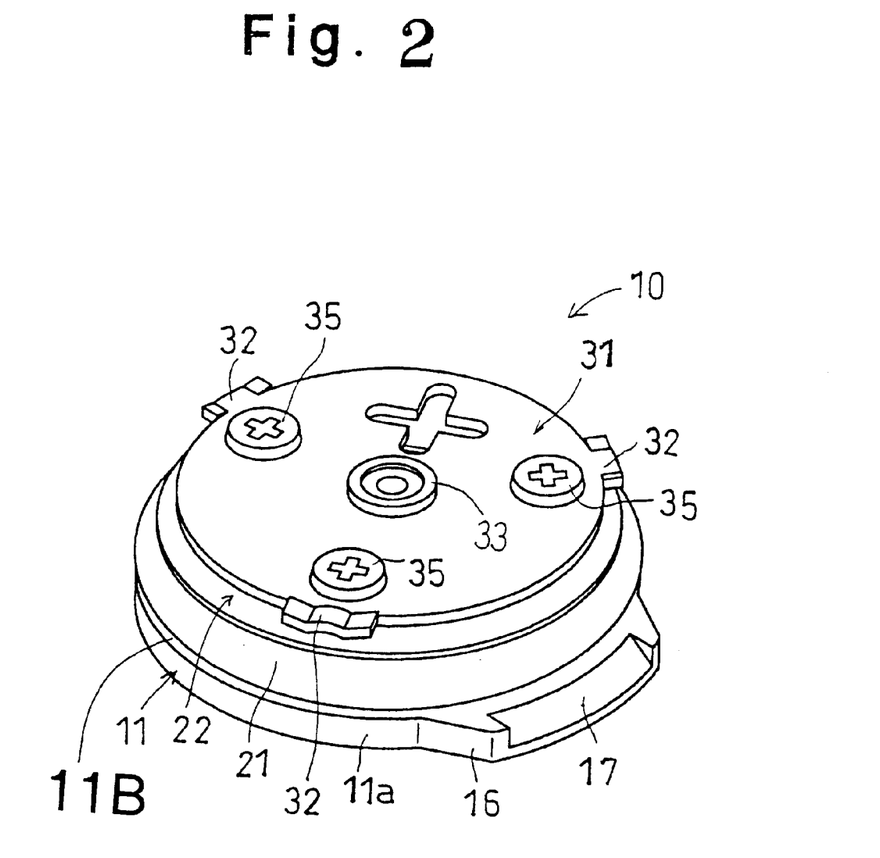
FIG. 2 is a perspective view of a cover assembly shown in FIG. 1, viewed from the rear side (battery contact plate side)

The cover 10 is assembled as follows:

The O-ring 21 is attached to the O-ring mounting rib 13 of the cover body 11. Since the inner diameter of the O ring 21 is slightly smaller than the outer diameter of the O-ring mounting rib 13 (O-ring support surface 14), the O ring 21 is snugly fitted onto the O-ring support surface 14 in an assembled state. Thereafter, the large diameter portion of the positioning projection 12 is inserted into the positioning hole 24, and the three cylindrical spacers 15 are inserted into the corresponding insertion holes 25, so that the O-ring support plate 22 presses against the O-ring 21. Note that the O-ring support plate 22 is placed so that the elastically deformable support portions 23 protrude in the direction away from the cover body 11. Thereafter, the battery contact plate 31 is placed on the O-ring support plate 22 so that the small diameter portion of the positioning projection 12 is inserted through the positioning hole 33a and the three threaded holes 15a correspond to the three through holes 34. Three securing screws 35 are screwed into the threaded holes 15a through the through holes 34 to secure the battery contact plate 31 to the cover body 11 (FIG. 2).

Figure 7:
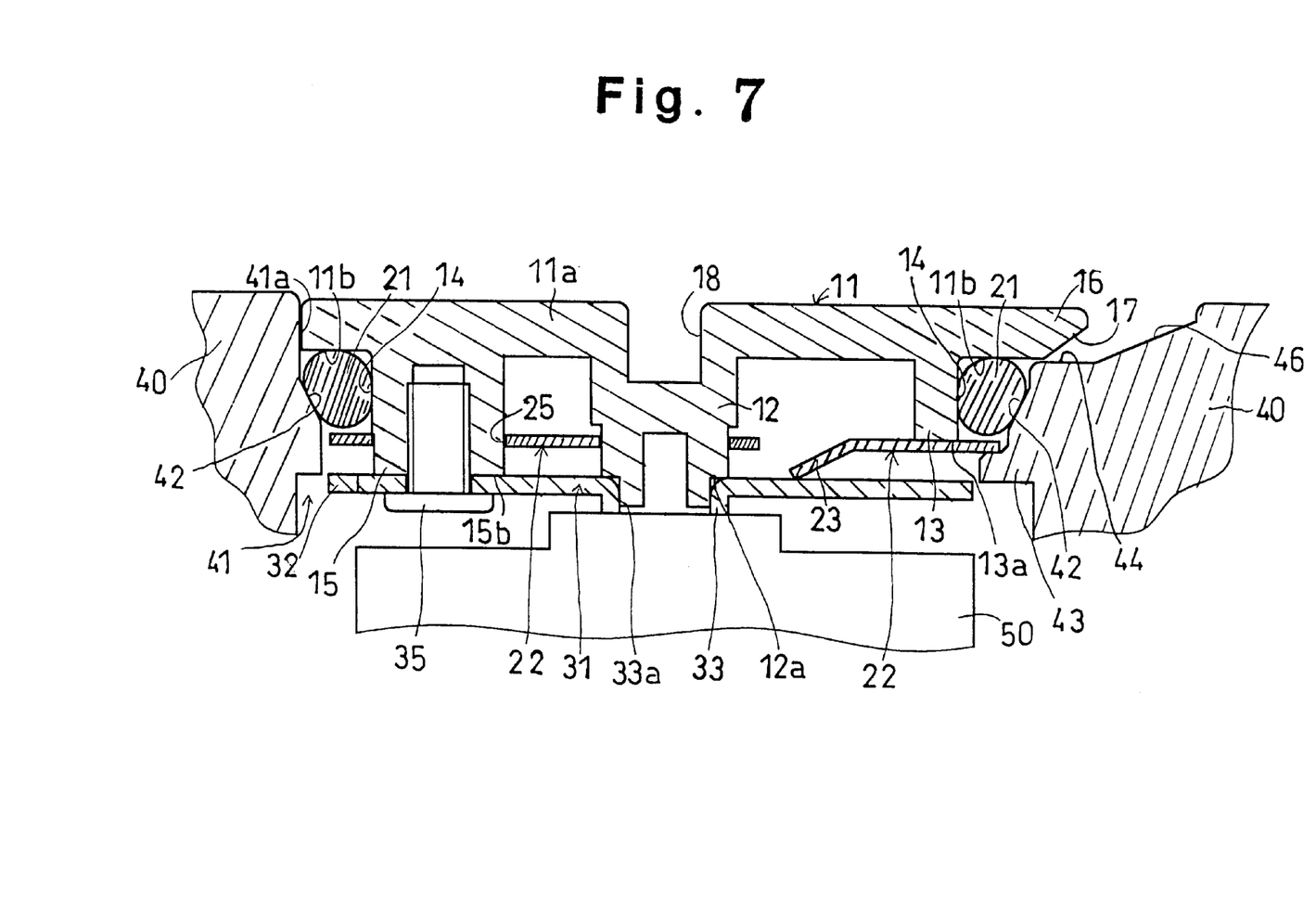
FIG. 7 is a sectional view taken along the line VII—VII in FIG. 4.
Figure 8:
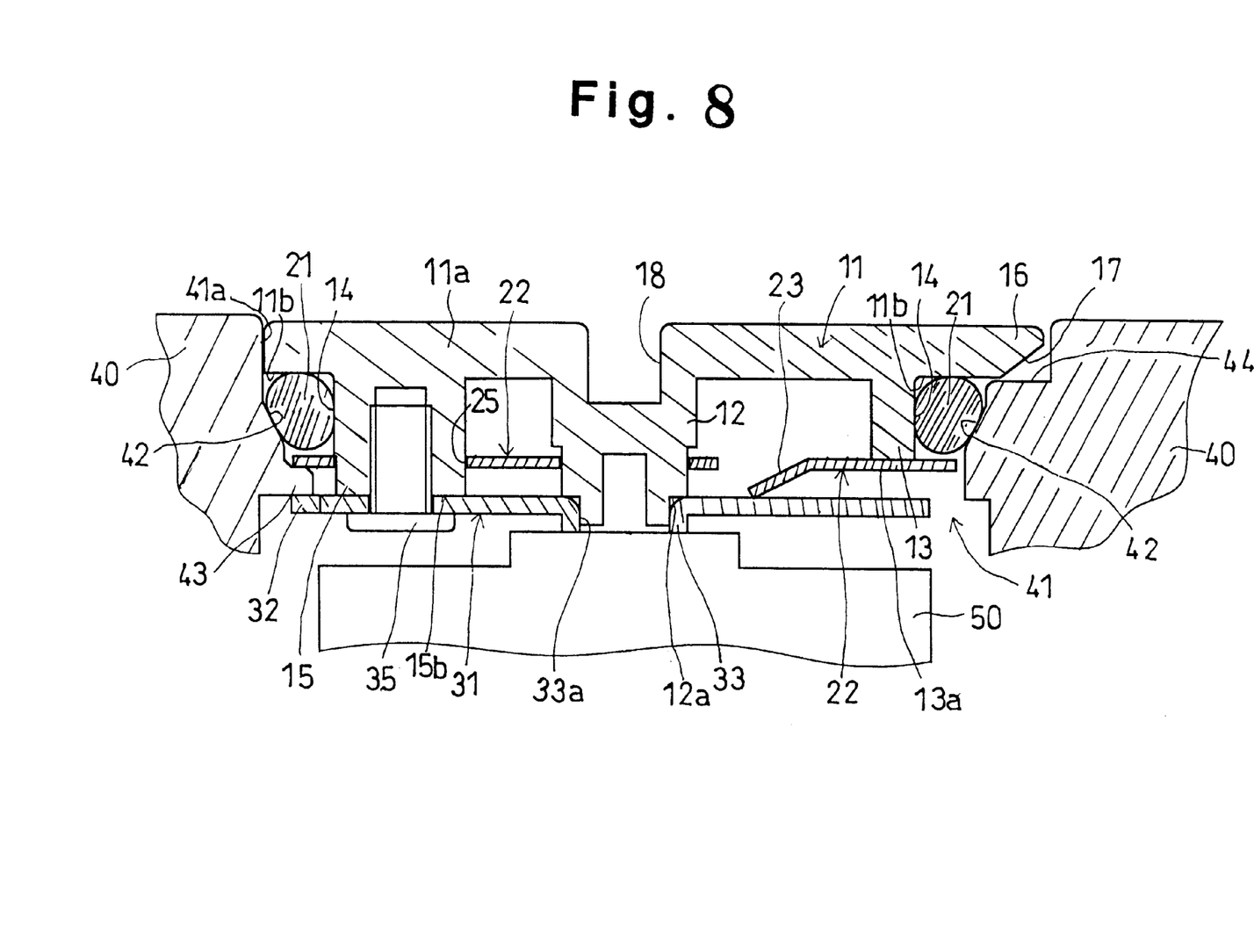
FIG. 8 is a sectional view taken along the line VIII—VIII in FIG. 5.

As can be seen in FIGS. 7 and 8, the axial position of the battery contact plate 31 relative to the cover body 11 is determined by the end surfaces 15b of the cylindrical spacers 15 and the restriction surface 12a. The axial position of the O-ring support plate 22 relative to the cover body 11 is determined by the end surface 13a of the O-ring mounting rib 13. As noted above, the O-ring support plate 22 is not directly fastened by the screws 35. Instead, when the battery contact plate 31 is mounted, the elastically deformable projections 23 come into spring contact with the battery contact plate 31 due to the elastic deformation thereof, so that the O-ring support plate 22 is pressed toward the end surface 13a of the O-ring mounting rib 13. Consequently, although only the cover body 11 and the battery contact plate 31 are fastened by the screws 35 in an assembled state, the O-ring support plate 22 is also firmly held therebetween. As can be understood from the foregoing, in an assembled state of the cover 10, a gap corresponding to a difference in the length of projection between the cylindrical spacers 15 and the O-ring mounting rib 13 is provided between the O-ring support plate 22 and the battery contact plate 31.

Since the cover body 11 and the O-ring support plate 22 are made of separate pieces in the cover 10 of the battery compartment, as mentioned above, the shape of the cover body 11 can be simple, having only the plate portion (disc portion 11a) and the cylindrical portion (O-ring mounting rib 13). Therefore, no sliding die is necessary upon molding the cover body 11, and hence there is no parting line on the O-ring supporting surface. Thus, not only can the molding be easily carried out, but also a water-tight structure can be attained. Moreover, the O-ring support plate 22 separate from the cover body 11 is not directly secured to the cover body 11 and is firmly held so as to hold the O-ring when the battery contact plate 31 is secured. Therefore, no means or process for securing the O-ring support plate 22 to the cover body 11 is needed, thus resulting in a simplification of the assembling operation and a reduction in the manufacturing cost.

The internal structure of the battery compartment to which the cover 10 is detachably attached will be discussed below with reference to FIGS. 3A, 3B, 7 and 8. A battery receptacle 40 is provided with a cylindrical battery compartment 41 in which a cylindrical battery 50 is accommodated. The inside and the outside of the battery compartment are interconnected through a circular opening 41a. The inner surface of the battery compartment 41 is provided with a partially conical surface 42 whose diameter is reduced in a direction from the circular opening 41a toward the bottom of the battery compartment 41.

Figure 3A:
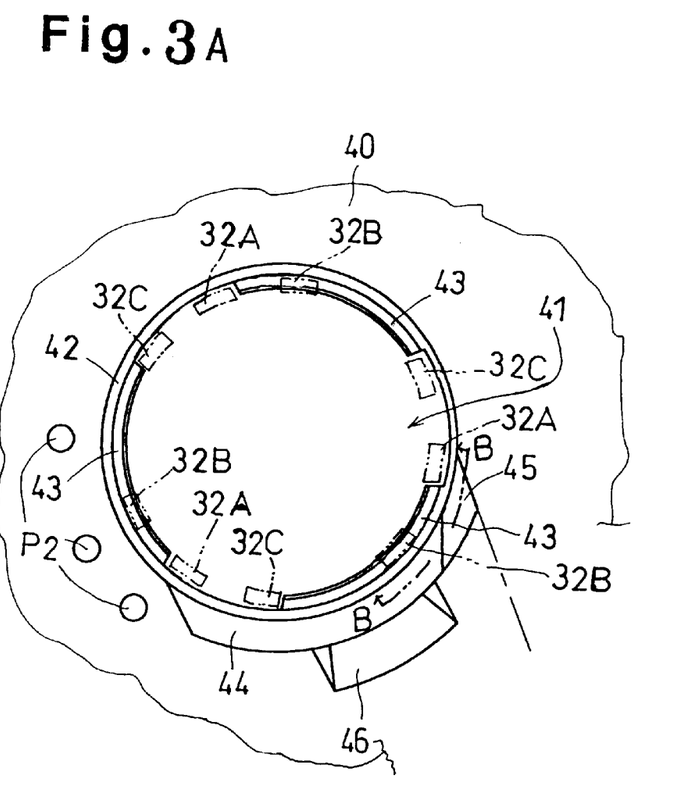
FIG. 3A is a plan view of a battery compartment of a camera body and the surroundings thereof.
Figure 3B:
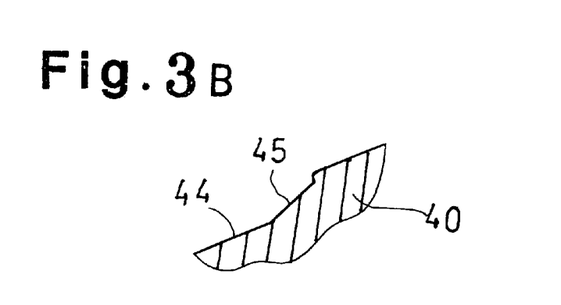
FIG. 3B is a sectional view taken along the line B-B in FIG. 3A.

The battery compartment 41 is provided, on the inner surface portion thereof below the conical surface 42, with three slip-off prevention flanges (disengagement flanges) 43 spaced in the circumferential direction at a substantially equi-angular distance. The inner diameter of the battery compartment 41, except for the slip-off prevention flanges 43 is larger than the outer diameter of the lock pawls 32 and the O-ring support plate 22. The inner diameter of the slip-off prevention flanges 43 is larger than the outer diameter of the battery contact plate 31, except for the lock pawls 32, and is smaller than the outer diameter of the lock pawls 32. Since the outer diameter of the lock pawls 32 is substantially identical to the outer diameter of the O-ring support plate 22, the inner diameter of the slip-off prevention flanges 43 is smaller than the outer diameter of the O-ring support plate 22. The thickness of the slip-off prevention flanges 43 is substantially identical to the gap produced between the O-ring support plate 22 and the battery contact plate 31 by the spring portions 23 in the assembled state of the cover 10.

The receptacle body 40 is partially cut-away in the form of an arc at the periphery of the circular opening 41a to form a guide recess 44 which can be adapted to guide the cam projection 16 to rotate in a plane perpendicular to the axis of the battery compartment 41. The guide recess 44 is longer than the cam projection 16 of the cover body 11 in the circumferential direction. The depth of the guide recess 44 corresponds to the thickness of the cam projection 16. A forced opening cam surface (oblique cam surface) 45 connected to one end of the guide recess 44 in the circumferential direction is formed, whose depth is gradually decreased from the bottom of the guide recess 44 toward the surface of the receptacle body 40, as shown in FIG. 3B. The guide recess 44 is connected to an oblique surface 46 whose depth is gradually decreased toward the surface of the receptacle body 40 in the radial direction (see FIGS. 7 and 8). The cam projection 16, the guide recess 44, and the oblique cam surface 45 constitute a forced opening guide mechanism.

A first electrical contact (not shown) which is elastically in contact with one of the electrodes of the battery 50 inserted in the battery compartment 41 is provided at the innermost (deepest) end portion of the cylindrical receptacle body 40. The first electrical contact has a resiliency to bias the battery 50 inserted in the receptacle body 40 in the ejection direction (in a direction toward the cover 10).

The detachable attachment of the cover 10 to the receptacle body 40 will be discussed below. As mentioned above, the diameter of the lock pawls 32 is greater than the inner diameter of the slip-off prevention flanges 43 of the battery compartment 41. Consequently, when the three lock pawls 32 are in an angular phase position in which they are located between the adjacent slip-off prevention flanges 43 having a predetermined length in the circumferential direction, the cover 10 can be detached from or attached to the battery compartment 41.

Figure 4:
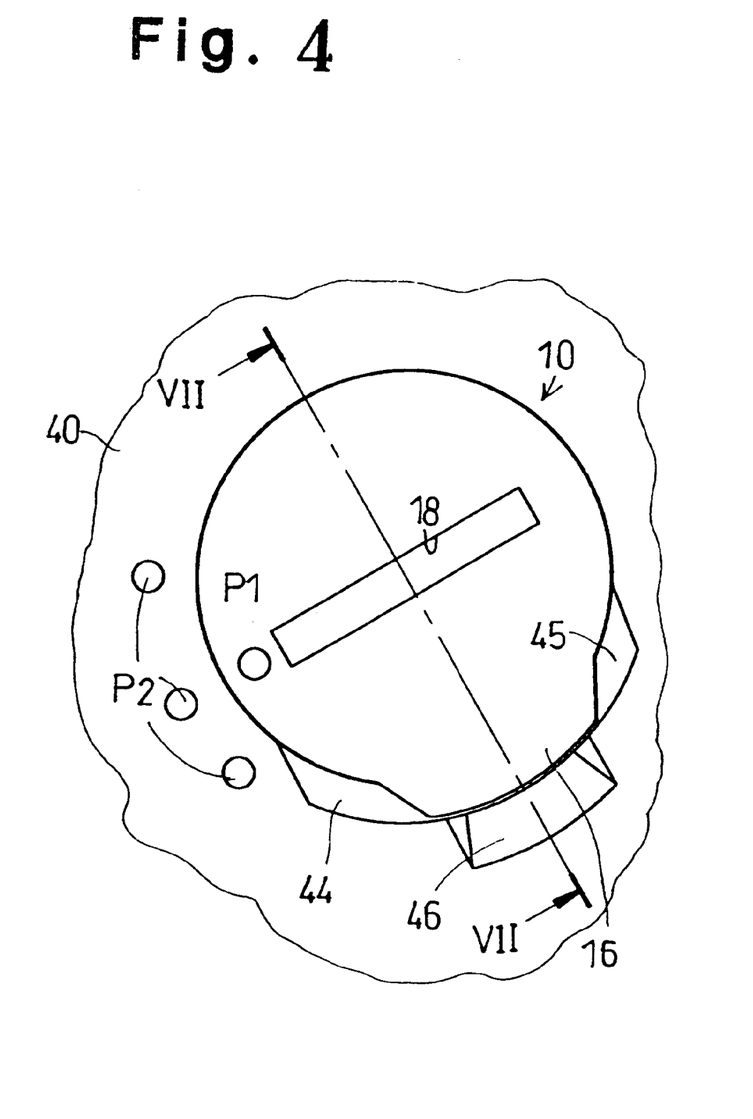
FIG. 4 is a plan view of a cover in an unlocking position.

When the cover 10 is in the angular phase position shown in FIG. 4, with respect to the receptacle body 40, the three lock pawls 32 are located in a position indicated at 32A in FIG. 3A. Namely, the lock pawls 32 are located between the adjacent slip-off prevention flanges 43. Therefore, the cover 10 can be fitted without interfering with the slip-off prevention flanges 43 until the surface of the cover body 11 is substantially flush with the surface of the receptacle body 40. The cover 10 and the receptacle body 40 in this unlocking position are shown in FIG. 7.

As shown in FIG. 7, when the cover 10 is attached to the receptacle body 40 in the unlocking position, the depth of the engagement of the cover 10 is restricted so that the O-ring support plate 22 whose diameter is greater than the diameter of the body of the battery contact plate 31 (except for the lock pawls 32) abuts against the slip-off prevention flanges 43 provided in the battery compartment 41. In this state, the O-ring 21 is located in the space defined by the rear surface 11b of the circular disc portion 11a of the cover body 11, the O-ring support surface 14, the conical surface 42 in the battery compartment 41 and the O-ring support plate 22 and is elastically deformed in the radial direction of the cover 10 by depressing by the O-ring support surface 14 and the conical surface 42. Due to the elastically deformed O-ring 21, the space defined between the O-ring support surface 14 and the conical surface 42 is sealed so that the battery compartment 41 can be sealed in a water tight fashion. Note, however, since the cover 10 is not locked in the angular position shown in FIG. 4, it is a possible for the cover 10 to be moved upward by the elastic restoring force of the O-ring 21 or the spring force acting on the battery 50 in the ejection direction if an external force by an operator is released.

To prevent this, an operator rotates the cover 10 in the clockwise direction in FIG. 4, while pressing the cover 10 downward so as not to move upward. The rotation can be carried out, using for example, a coin which is inserted in the rotation operation groove 18. When the cover 10 is rotated to a position shown in FIG. 5, the three lock pawls 32 provided on the battery contact plate 31 are moved to a position indicated by 32B in FIG. 3A, so that the lock pawls 32 are located underneath the slip-off prevention flanges 43 (i.e., on the rear surfaces of the slip-off prevention flanges). Thus, no disengagement of the cover 10 occurs. Moreover, since the O-ring 21 is elastically deformed (collapsed), the battery compartment 41 is kept in a water tight state without pressing the cover 10. Namely, the cover 10 is locked.

As mentioned above, when the O-ring 21 is elastically deformed in the radial direction of the cover 10, the battery compartment 41 is sealed in a water tight fashion. To this end, the battery compartment 41 is provided with the conical surface 42 opposed to the O-ring support surface 14, so that the O-ring 21 can be easily elastically deformed in the radial direction. If an over deformation of the O-ring 21 toward the bottom of the battery compartment 41 takes place, the seal between the O-ring support surface 14 and the conical surface 42 may be incomplete. The position of the O-ring 21 is restricted by the O-ring support plate 22 to prevent any possibility of incomplete sealing between the O ring support surface 14 and the conical surface 42,.

When the cover 10 is in the lock position, the first electrical contact provided at the deepest portion of the battery compartment 41 is in contact with the bottom or lower electrode (negative electrode) of the battery 50, so that the top or upper electrode (positive electrode) of the battery 50 is pressed against the contact 33 of the battery contact plate 31 due to the biasing force of the electrical contact. In the battery compartment 41, there is provided a second electrical contact (not shown) which comes into contact with one of the three lock pawls 32 when the cover 10 is in the lock position. Since the battery contact plate 31 is made of an electrically conductive material, the electrical connection is established between the battery contact plate 31 and the second electrical contact when the cover 10 is rotated to the lock position. The first and second electrical contacts are electrically connected to a power source circuit.

Figure 5:
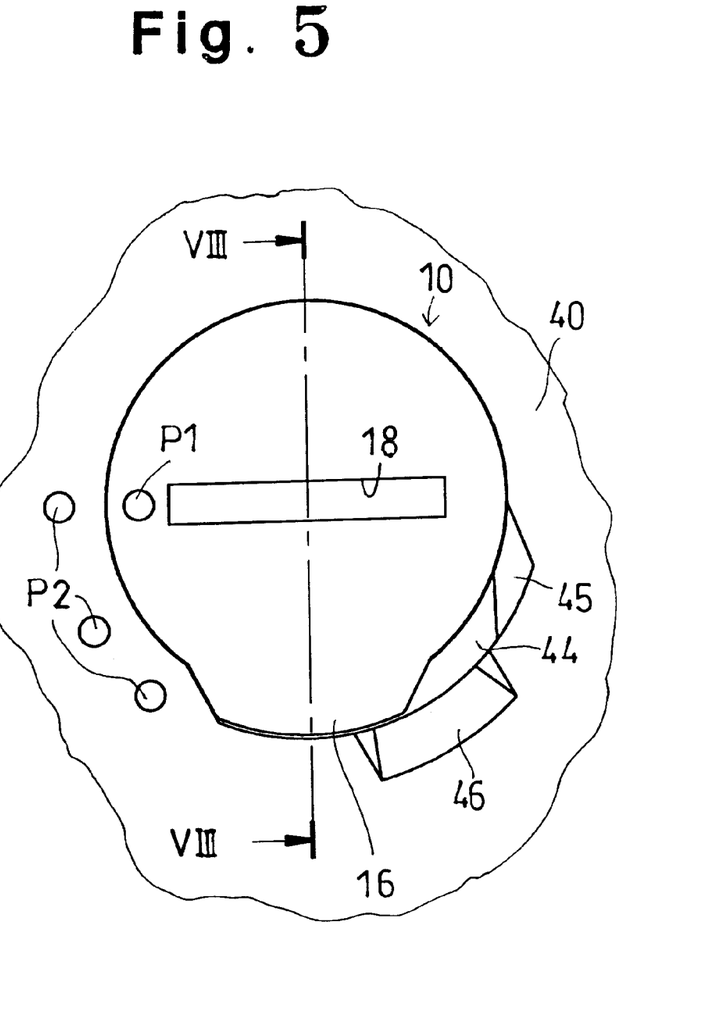
FIG. 5 is a plan view of a cover in a lock position.

Note that the end of the cam projection 16 in the circumferential direction abuts against the end of the guide recess 44 in the circumferential direction, and hence the rotation of the cover 10 in the clockwise direction at the lock position shown in FIG. 5 is restricted.

When the cover 10 is rotated from the locked position shown in FIG. 5 to the unlocking position shown in FIG. 4, in the counterclockwise direction, the cover 10 can be disengaged from the circular opening 41a. However, if the cover 10 is held in the lock position for a long time, the O-ring 21 could be permanently collapsed (i.e., the O-ring could loose its elasticity). Moreover, if a battery is not loaded into the battery compartment 41, there is no force acting on the battery to eject the same. In either case, it is difficult to disengage or detach the cover 10 even if the cover is rotated to the unlocking position. In the unlocking position, the cam projection 16 of the cover 10 is identical in the angular phase to the oblique surface 46 of the receptacle body 40. Therefore, the cover 10 can be detached or disengaged by inserting a coin in the gap between the oblique surface 17 of the cam projection 16 and the oblique surface 46 to move the cam projection upward.

One of the significant features of the opening and closing mechanism in the illustrated embodiment resides in a forced opening of the cover 10 at an angular position different from the unlocking position or lock position. As can be seen in FIG. 3A, in the unlocking position of the cover 10, the lock pawls 32 are located so that the pawls 32 can be immediately moved underneath the slip-off prevention flanges 43 as soon as the cover is rotated in the clockwise direction (toward the lock position). The slip-off prevention flanges 43 are formed so that when the rotation of the cover 10 from the unlocking position in the counterclockwise direction (opposite to the locking direction) occurs, the three lock pawls 32 are still located between the adjacent slip-off prevention flanges 43. The cover 10 can be forcedly opened when it is rotated from the unlocking position shown in FIG. 4 in the direction opposite to the locking direction, as will be discussed below.

As mentioned above, the guide recess 44 is connected to the forced opening cam surface 45 whose depth is gradually decreased in the circumferential direction, and hence when the rotation of the cover 10 from the unlocking position shown in FIG. 4 in the direction opposite to the direction toward the lock position shown in FIG. 5 occurs, the circumferential end of the cam projection 16 abuts against the forced opening cam surface 45. Since the depth of the forced opening cam surface 45 is gradually decreased in the circumferential direction, when the cam projection 16 is moved along the forced opening cam surface 45 in accordance with the rotation of the cover 10, a force to move the cover 10 away from the circular opening 41a is produced. During the rotation of the cover 10 from the unlocking position shown in FIG. 4 in the counterclockwise direction, the three lock pawls 32 are located between the adjacent slip-off prevention flanges 43 to maintain the cover 10 in the unlocked state. Consequently, the cover 10 is moved upward due to the force produced by the contact of the cam projection 16 with the forced opening cam surface 45 to thereby disengage the cover 10 from the circular opening 41a.

Figure 6:
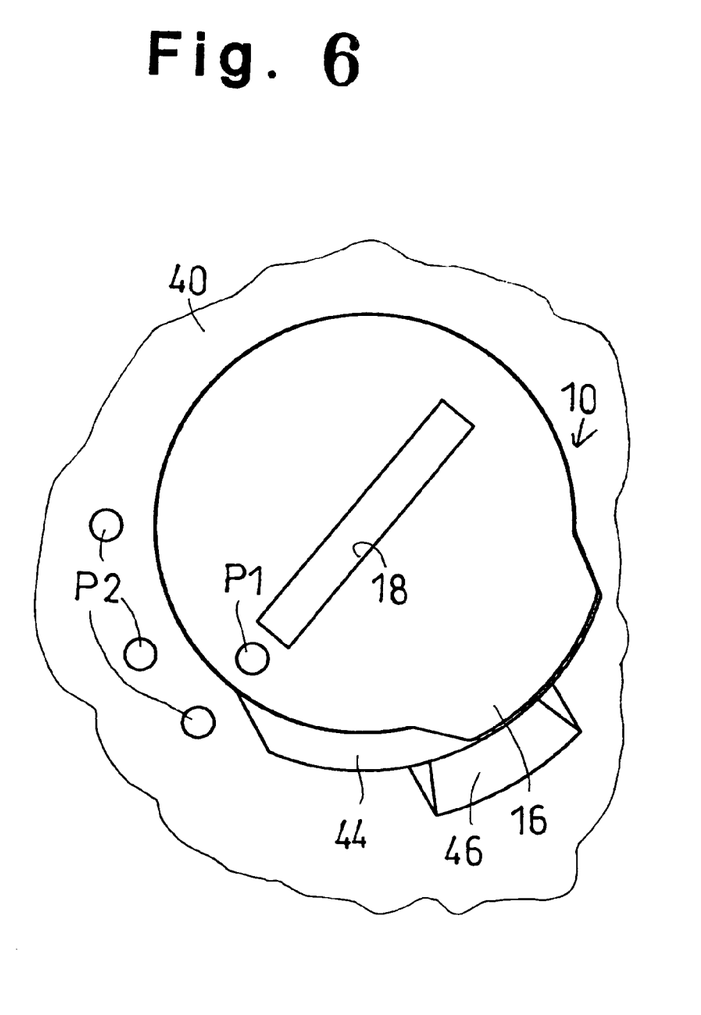
FIG. 6 is a plan view of a cover in an forced open position.

When the cover 10 is rotated to the position shown in FIG. 6, the cover is completely disengaged from the circular opening 41a. In this state, the three lock pawls 32 are placed as indicated at 32C in FIG. 3A, i.e., between the adjacent slip-off prevention flanges (disengagement prevention flanges) 43; so that the cover 10 can be opened. In the opening operation of the cover 10 using the forced opening cam surface 45 as mentioned above, the cover 10 can be detached in accordance with the rotation operation regardless of the permanent collapse of the O-ring 21 or presence or absence of the battery 50 in the battery compartment. Namely, the angle position shown in FIG. 6 can be referred to as a forced or compulsive opening position of the cover 10.

The cover 10 is provided, as shown in FIGS. 4 through 6, with a reference mark P1 and the receptacle body 40 is provided with three reference marks P2 corresponding to the three rotational positions (angle positions) of the cover 10 as mentioned above. When the cover 10 is attached or detached, the cover 10 is rotated so that the reference mark P1 thereon is registered with one of the three reference marks P2 of the receptacle body 40 to obtain a desired angle position.

In the opening and closing mechanism for the battery compartment in the illustrated embodiment, the cover can be detached by rotating the cover to the forced opening position, without forcedly inserting a tool between the cover and the receptacle body in the unlocking position, thus resulting in high operation efficiency and easy replacement of the battery. Moreover, since the cover 10 in the locked state is moved to the forced opening position past the neutral unlocking position, it is possible to prevent the cover 10 from being suddenly detached upon unlocking by appropriately selecting the neutral unlocking position. Consequently, the cover 10 can be prevented from being lost or damaged.

Although the above discussion has been directed to a water-proof opening and closing mechanism for a battery compartment, the present invention can be applied to an opening and closing mechanism having no water-proof structure. For instance, in a non water-proof opening and closing mechanism for a battery compartment, it is difficult to open the cover when no battery is loaded in the battery compartment since no force to eject the battery is produced. However, if the cover is selectively moved between a neutral unlocking position and a forced opening position, not only can the cover be easily opened, but also there is no danger of the cover being lost or damaged.

In the cover 10 for a battery compartment in the illustrated embodiment, since the O-ring support plate 22 is provided with the elastically deformable support portions (spring portions) 23 which hold and space the battery contact plate 31 from the O-ring support plate 22, no independent or separate securing operation of the O ring support plate 22 is needed. Namely, the O-ring support plate 22 can be secured to the cover body 11 at the same time as the battery contact plate 31 is secured to the cover body by the screws 35. Consequently, the assembling operation can be simplified. Moreover, it is not necessary for the cover body 11 to be provided on its outer peripheral surface with an annular groove, and hence the manufacturing cost of the cover can be reduced without deteriorating water-tightness thereof.

Figure 9:
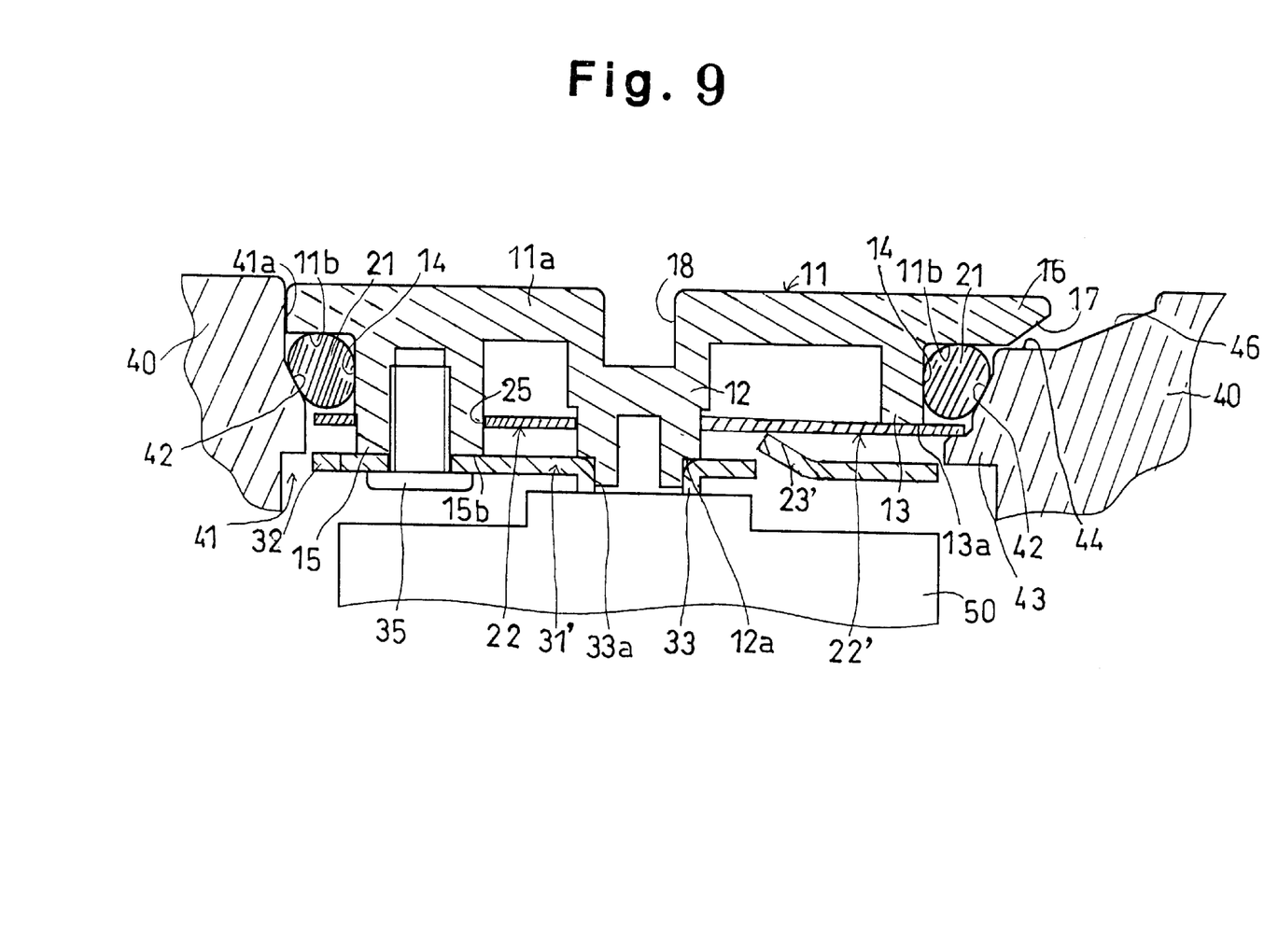
FIG. 9 is a sectional view of another embodiment of a cover for a battery compartment, taken along the same line as that of FIG. 7; and, FIG. 10 is a sectional view of yet another embodiment of a cover for a battery compartment, taken along the same line as that of FIG. 7.

The present invention is not limited to the illustrated embodiments. For instance, it is possible to provide the projecting supports such as the supporting spring portions 23 on the battery support plate in place of the O-ring support plate. This alternative arrangement is shown in FIG. 9 in which the O-ring support plate 22' has no projecting support and the battery contact plate 31' is provided with supporting spring portions (elastically deformable portions) 23' which are formed by cutting and bending a part of the battery contact plate 31'. The operation of the supporting spring portions 23' is the same as that of the supporting spring portions 23 in the above mentioned embodiment.

Figure 10:
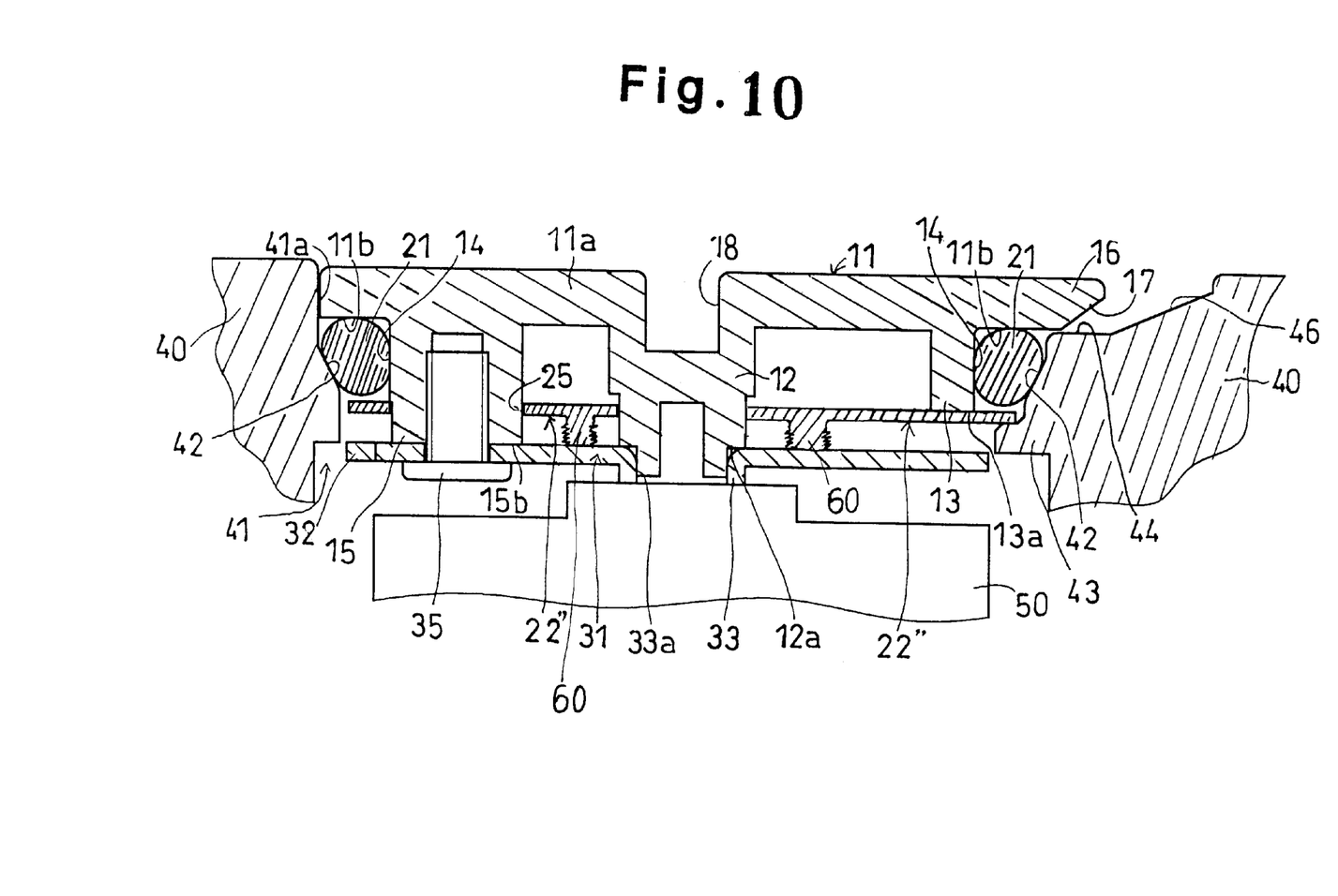

It is possible to provide, as a supporting means for holding the O-ring support plate spaced from the battery contact plate at a predetermined distance, a plurality of projections which are capable of plastically deforming, in place of the supporting spring portions 23. This alternative is shown in FIG. 10 in which the O-ring support plate 22" is provided on its lower surface with plastically deformable projections 60. The length of the deformable projections 60 in a direction parallel to the axis of the circular cover in a free state is longer than the distance between the end surface 13a of the O-ring mounting rib 13 and the battery contact plate 31, so the deformation or collapse of the projections 60 is caused by and between the battery contact plate 31 and the O-ring support plate 22" when the battery contact plate 31 is secured. With this structure, it is possible to hold the O-ring support plate 22" so as to abut against the end surface 13a of the O-ring mounting rib 13.

As may be understood from the above discussion, according to the present invention, a simple opening and closing mechanism having a high operation efficiency, for a battery compartment can be provided. Moreover, according to the present invention, a battery compartment cover which exhibits a good water-proof and drip proof property and which can be easily assembled at low cost can be provided.

What is claimed is:

1. An opening and closing mechanism for a battery compartment comprising:

a circular opening formed in a battery compartment for insertion of a battery through said opening;

a plurality of disengagement prevention flanges that are formed at the peripheral edge of said circular opening;

a circular cover for substantially covering said circular opening; and a plurality of lock pawls provided at the peripheral edge of said circular cover;

wherein said lock pawls can enter the spaces between the disengagement prevention flanges in an unlocking position of the circular cover and are located on the back surfaces of the disengagement prevention flanges when the circular cover rotates from the unlocking position to a lock position, and wherein the lengths of said disengagement prevention flanges and of said lock pawls in the circumferential direction are set so that when the circular cover is rotated by a predetermined angle from the unlocking position in a direction opposite to the direction toward the lock position, the lock pawls are retained in the spaces between the disengagement prevention flanges.

2. An opening and closing mechanism for a battery compartment according to claim 1, further comprising a forced opening mechanism provided between the circular opening and the circular cover, which forces the circular cover to move in a direction away from the circular opening in accordance with the rotation of the circular cover through a predetermined angle from the unlocking position toward said opposite direction.

3. An opening and closing mechanism for a battery compartment according to claim 2, wherein said forced opening guide mechanism comprises:

a cam projection provided at the periphery of the circular cover, said cam projection extending in a plane perpendicular to the axis thereof;

a guide recess that is formed at the periphery of the circular opening to guide the cam projection so as to allow rotation of the circular cover; and an oblique cam surface that is formed at the periphery of the circular opening and that is connected to the guide recess, the depth of the oblique cam surface being gradually decreased from the guide recess, so that the cam projection can be guided to move away from the circular opening.

4. An opening and closing mechanism for a battery compartment according to claim 3, wherein said guide recess has a uniform depth.

5. An opening and closing mechanism for a battery compartment according to claim 1, wherein said circular cover is provided with a seal member, said seal member being depressed between the circular cover and the periphery of the circular opening to be elastically deformed in the lock position to seal the circular opening of the battery compartment in a water-tight fashion.

6. A circular cover for closing a cylindrical battery compartment which has a circular opening at one end thereof, in a water-tight fashion, said cover comprising:

a cover body which is composed of a circular disc portion corresponding to the circular opening and a cylindrical portion which extends in a direction perpendicular to the circular disc portion;

an annular elastic seal member positioned on an outer peripheral surface of said cylindrical portion, said seal member configured to substantially water-tightly seal said circular opening;

a battery contact plate comprising a conductor and secured to the cover body at a predetermined distance from the end of the cylindrical portion of the cover body;

a support plate which is provided between the end of the cylindrical portion of the cover body and the battery contact plate to hold said annular elastic seal member between the support plate and the circular disc portion; and a plurality of projecting supports which are provided on one of the support plate and the battery contact plate so as to bias the support plate to abut against the end of the cylindrical portion.

7. A cover for closing a cylindrical battery compartment according to claim 6, wherein said support plate is not secured to said cover body while said battery contact plate is secured to said cover body, whereby the support plate is biased to abut against the end of the cylindrical portion of the cover body through the projecting supports.

8. A cover for closing a cylindrical battery compartment according to claim 6, wherein said projecting supports have enough resilience to bias the support plate in a direction to abut against the end of the cylindrical portion of the cover body.

9. A cover for closing a cylindrical battery compartment according to claim 6, wherein the length of the projecting supports in a direction parallel to the axis of the circular cover is greater than the distance between the battery contact plate secured to the cover body and the end of the cylindrical portion of the cover body, so that when the battery contact plate is secured, the projecting supports are held between the battery contact plate and the support plate and a plastic deformation of the projecting supports occurs to hold the support plate so as to abut against the end of the cylindrical portion of the cover body.

10. A cover for closing a cylindrical battery compartment according to claim 6, further comprising:

a plurality of disengagement prevention flanges that are formed at the peripheral edge of said circular opening; and a plurality of lock pawls provided at the peripheral edge of said cover body;

wherein said lock pawls can enter the spaces between the flanges in an unlocking position of the cover body and are located on the back surfaces of the flanges when the cover body rotates from the unlocking position to a lock position, and wherein the lengths of said disengagement prevention flanges and said lock pawls in the circumferential direction are set so that when the cover body is rotated by a predetermined angle from the unlocking position in a direction opposite to the direction toward the lock position, the lock pawls are still held in the spaces between the disengagement prevention flanges.

11. A cover for closing a cylindrical battery compartment according to claim 10, further comprising a forced opening guide mechanism between the circular opening and the cover, which forces the cover to move in a direction away from the circular opening in accordance with the rotation of the cover through a predetermined angle from the unlocking position toward said opposite direction.

12. An opening and closing mechanism for a battery compartment according to claim 11, wherein said forced opening guide mechanism comprises:

a cam projection provided at the periphery of the cover body, said cam projection extending in a plane perpendicular to the axis of thereof;

a guide recess that is formed at the periphery of the circular opening to guide the cam projection so as to allow rotation of the cover; and an oblique cam surface that is formed at the periphery of the circular opening and that is connected to the guide recess, the depth of the oblique cam surface being gradually decreased from the guide recess, so that the cam projection can be guided to move away from the circular opening.

13. A cover for closing a cylindrical battery compartment according to claim 12, wherein said guide recess has a uniform depth.

14. The cover for closing a cylindrical battery compartment according to claim 6, wherein said annular elastic seal member being compressed between the cover and the periphery of the circular opening to be elastically deformed in the lock position to seal the circular opening of the battery compartment in a water-tight fashion.

15. An opening and closing mechanism for a battery compartment comprising:

a circular opening formed in a battery compartment for insertion of a battery through said opening; and an opening and closing circular cover for substantially covering said circular opening, said cover being rotatable relative to said circular opening between a lock position and an unlocking position, said cover closing the opening when the cover is positioned at the lock position and being detachable from the circular opening when the cover is positioned at the unlocking position;

wherein said cover is further rotatable relative to said circular opening when the cover is positioned at the unlocking position by a predetermined angle in a direction opposite to the direction toward the lock position; and wherein said cover is detachable from the circular opening at any rotational position between the unlocking position and a rotational extremity in the direction opposite to the lock position.

16. An opening and closing mechanism for a battery compartment according to claim 15, further comprising a forced opening guide mechanism provided between the circular opening and the cover, which forces the cover to move in a direction away from the circular opening in accordance with the rotation of the cover through a predetermined angle from the unlocking position toward said opposite direction.

17. An opening and closing mechanism for a battery compartment comprising:

a circular opening formed in a battery compartment;

a plurality of disengagement prevention flanges that are formed at a peripheral edge of said circular opening;

a circular cover for said circular opening;

a plurality of lock pawls provided at the peripheral edge of said circular cover;

a forced opening mechanism provided between the circular opening and the circular cover and configured to force the circular cover to move in a direction away from the circular opening in accordance with the rotation of the circular cover through a predetermined angle from the unlocking position toward said opposite direction;

wherein said lock pawls can enter the spaces between the flanges in an unlocking position of the circular cover and are located on the back surfaces of the flanges when the circular cover rotates from the unlocking position to a lock position, and wherein the lengths of said disengagement prevention flanges and said lock pawls in the circumferential direction are set so that when the circular cover is rotated by a predetermined angle from the unlocking position in a direction opposite to the direction toward the lock position, the lock pawls are still held in the spaces between the disengagement prevention flanges.

18. The opening and closing mechanism for a battery compartment according to claim 17, wherein said forced opening guide mechanism comprises:

a cam projection provided at the periphery of the circular cover, said cam projection extending in a plane perpendicular to the axis thereof;

a guide recess that is formed at the periphery of the circular opening to guide the cam projection so as to allow rotation of the circular cover; and an oblique cam surface that is formed at the periphery of the circular opening and that is connected to the guide recess, the depth of the oblique cam surface being gradually decreasing from the guide recess, so that the cam projection can be guided to move away from the circular opening.

19. An opening and closing mechanism for a battery compartment comprising:

a circular opening formed in a battery compartment;

an opening and closing circular cover for said circular opening, said cover being rotatable relative to said circular opening between a lock position and an unlocking position, said cover closing the opening when the cover is positioned at the lock position and being detachable from the circular opening when the cover is positioned at the unlocking position;

a forced opening guide mechanism provided between the circular opening and the cover, which forces the cover to move in a direction away from the circular opening in accordance with the rotation of the cover through a predetermined angle from the unlocking position toward said opposite direction.

wherein said cover is further rotatable relative to said circular opening when the cover is positioned at the unlocking position by a predetermined angle in a direction opposite to the direction toward the lock position; and wherein said cover is detachable from the circular opening at any rotational position between the unlocking position and a rotational extremity in the direction opposite to the lock position.

20. The opening and closing mechanism for a battery compartment according to claim 19, wherein said forced opening guide mechanism comprises:

a cam projection provided at the periphery of the circular cover, said cam projection extending in a plane perpendicular to the axis thereof;

a guide recess that is formed at the periphery of the circular opening to guide the cam projection so as to allow rotation of the circular cover; and an oblique cam surface that is formed at the periphery of the circular opening and that is connected to the guide recess, the depth of the oblique cam surface being gradually decreasing from the guide recess, so that the cam projection can be guided to move away from the circular opening.

* * * * *